(12) United States Patent
Min

(10) Patent No.: US 11,239,697 B2
(45) Date of Patent: Feb. 1, 2022

(54) WIRELESS CHARGING SYSTEM FOR PORTABLE TERMINAL

(71) Applicant: FOURING CO., LTD., Seoul (KR)

(72) Inventor: Jee Hong Min, Seoul (KR)

(73) Assignee: FOURING CO., LTD., Seoul (KR)

( * ) Notice: Subject to any disclaimer, the term of this patent is extended or adjusted under 35 U.S.C. 154(b) by 0 days.

(21) Appl. No.: 16/965,156

(22) PCT Filed: Aug. 6, 2019

(86) PCT No.: PCT/KR2019/009802
§ 371 (c)(1),
(2) Date: Jul. 27, 2020

(87) PCT Pub. No.: WO2020/141680
PCT Pub. Date: Jul. 9, 2020

(65) Prior Publication Data
US 2021/0050743 A1    Feb. 18, 2021

Related U.S. Application Data

(60) Provisional application No. 62/788,419, filed on Jan. 4, 2019.

(30) Foreign Application Priority Data

Jan. 9, 2019    (KR) .......................... 10-2019-0002810

(51) Int. Cl.
*H02J 50/10*    (2016.01)
*H02J 50/00*    (2016.01)
(Continued)

(52) U.S. Cl.
CPC .......... *H02J 50/10* (2016.02); *B60R 11/0241* (2013.01); *H02J 7/0044* (2013.01);
(Continued)

(58) Field of Classification Search
CPC .......... H02J 50/10; H02J 7/025; H02J 50/005; H02J 50/12; B60R 11/02; B60R 11/0241;
(Continued)

(56) References Cited

U.S. PATENT DOCUMENTS 9,773,601 B2 *   9/2017   Breiwa .............. F16M 11/2078
2010/0081377 A1   4/2010   Chatterjee et al.
(Continued)

FOREIGN PATENT DOCUMENTS

JP    2014-124080 A   7/2014
KR    10-1529469 B1   6/2015
(Continued)

*Primary Examiner* — Ryan Johnson
(74) *Attorney, Agent, or Firm* — Novick, Kim & Lee, PLLC; Sang Ho Lee; Hyun Woo Shin

(57) ABSTRACT

Provided is a wireless charging system for a portable terminal, the system including: a terminal accessory which is fixed to the rear surface of a portable terminal and in which a transmission coil for generating a magnetic field for electromagnetic induction-type wireless charging is embedded; and a wireless charging device which is couplable to the terminal accessory by using magnetism, wherein: the terminal accessory and the wireless charging device include a first electric contact point and a second electric contact point, respectively, and thus, when the terminal accessory and the wireless charging device are coupled to each other, the first and second electric contact points come into contact with each other, so that power is supplied from the wireless charging device to the transmission coil embedded in the terminal accessory; and two or more magnets arranged in different polar directions from each other are provided at the wireless charging device.

11 Claims, 9 Drawing Sheets

(51) Int. Cl.
*H02J 7/00* (2006.01)
*H04M 1/04* (2006.01)
*B60R 11/02* (2006.01)
*B60R 11/00* (2006.01)

(52) U.S. Cl.
CPC ............ *H02J 50/005* (2020.01); *H04M 1/04*
(2013.01); *B60R 2011/0005* (2013.01); *B60R 2011/007* (2013.01); *B60R 2011/0008* (2013.01)

(58) Field of Classification Search
CPC ....... B60R 2011/0005; B60R 2011/007; B60R 2011/0008; B60R 2011/0026; B60R 2011/0056; H04M 1/04
See application file for complete search history.

(56) References Cited

U.S. PATENT DOCUMENTS

| | | | |
|---|---|---|---|
| 2012/0146576 A1 | 6/2012 | Partovi | |
| 2014/0176062 A1* | 6/2014 | Jung | ............... H02J 50/90 |
| | | | 320/108 |
| 2018/0115184 A1 | 4/2018 | Lee | |
| 2019/0198212 A1* | 6/2019 | Levy | ............... B62J 50/225 |

FOREIGN PATENT DOCUMENTS

| | | | |
|---|---|---|---|
| KR | 10-2016-0109190 A | | 9/2016 |
| KR | 10-1738073 B1 | | 5/2017 |
| KR | 20170134999 A | * | 12/2017 |
| KR | 10-1868277 B1 | | 7/2018 |
| KR | 10-2018-0137773 A | | 12/2018 |
| WO | 2017/026650 A1 | | 2/2017 |

\* cited by examiner (a)

(b)

WIRELESS CHARGING SYSTEM FOR PORTABLE TERMINAL

TECHNICAL FIELD

The present invention relates to a wireless charging system, and more specifically, to a wireless charging system having a structure capable of wireless charging, which can be easily attached to a portable terminal such as a smartphone, and used for wireless charging.

BACKGROUND ART

Various types of cradles for vehicles have been developed to conveniently use electronic devices including smartphones while driving.

Recently, as various functions of navigators, black boxes and the like for vehicles are integrated into a smartphone owing to advancement in smartphones, necessity of a cradle for vehicles increases more and more.

Generally, a cradle for vehicles is a structure of attaching a smartphone by insertion-coupling the smartphone at an end portion and adsorbing and attaching the opposite end portion to the windshield, dashboard or the like of a vehicle. However, the cradle for vehicles described above has a problem in that its structure is complicated and the cradle for vehicles is easily separated from the attachment surface due to heavy weight. In addition, when a user desires to use the smartphone while driving, the user should push the smartphone toward the side surface from the cradle for vehicles to release the insertion-coupled state, and therefore, there is a problem in that it is inconvenient to use.

Therefore, a minimalist method of attaching a smart ring to the rear surface of a smartphone and inserting the smart ring into a vent hole of a vehicle is much in vogue recently.

Although such a smart ring has an advantage of being easily attached to and removed from a vehicle, since the smart ring easily deviates from a fixed position due to vibration of the vehicle, there is a problem in that it is difficult to stably fix the smartphone to the vehicle.

In addition, since the smart ring is in a shape of a small ring attached on the rear surface of a smartphone, the position capable of fixing the smartphone in a vehicle is limited, and accordingly, it is difficult to fix the smartphone at a position of a distance fit for the sight of a driver.

Meanwhile, although various methods and devices for wirelessly charging a portable terminal such as a smartphone are developed recently, there is a problem in that when an accessory such as a smart ring, a case or the like is attached on the rear surface of the smartphone, wireless charging is not progressed, or charging efficiency abruptly decreases.

DISCLOSURE OF INVENTION

Technical Problem

Therefore, the present invention has been made in view of the above problems, and it is an object of the present invention to provide a wireless charging system for a portable terminal, which can be easily attached to a portable terminal such as a smartphone and used for wireless charging, and enhance charging efficiency.

Technical Solution

To accomplish the above object, according to one aspect of the present invention, there is provided a wireless charging system for a portable terminal, the system comprising: a terminal accessory fixed on the rear surface of the portable terminal and embedded with a transmission coil for generating a magnetic field for wireless charge of magnetic induction method; and a wireless charging device that can be combined with the terminal accessory using magnetic force, wherein the terminal accessory and the wireless charging device are provided with a first electric contact point and a second electric contact point, respectively, and when the terminal accessory and the wireless charging device are combined, the first and second electric contact points contact each other, and power is supplied from the wireless charging device to the transmission coil embedded in the terminal accessory, and the wireless charging device is provided with two or more magnets arranged in different polarity directions.

According to another aspect of the present invention, there is provided a wireless charging device for a portable terminal, which is combined with a terminal accessary embedded with a transmission coil to charge the portable terminal, the device comprising: a coupling unit combined with the terminal accessory using magnetic force, and provided with a second electric contact point for being in contact with a first electric contact point formed in the terminal accessory; and a cable one end of which is connected to the coupling unit and electrically connected to the second electric contact point, wherein when the terminal accessory and the wireless charging device are combined, power supplied through the cable is transferred to the transmission coil of the terminal accessory as the first and second electric contact points contact each other, and two or more magnets arranged in different polarity directions are embedded in the coupling unit.

Advantageous Effects

In the present invention, as a transmission coil is embedded in an accessory fixed on the rear surface of a portable terminal to supply power through a contact point when the portable terminal is combined with a wireless charging device, the portable terminal is wirelessly charged using a magnetic field generated by the terminal accessory, and thus wireless charging can be effectively performed even when an accessory such as a smart ring, a case or the like is mounted on the portable terminal.

In addition, as a plurality of guides is formed around the contact point, where the terminal accessory and the wireless charging device are combined, to easily align the position of the contact point when the terminal accessory and the wireless charging device are combined, wireless charging efficiency can be improved when the positions of the transmission coil embedded in the terminal accessory and the reception coil of the portable terminal are accurately aligned.

According to another embodiment of the present invention, as a plurality of magnets embedded in the wireless charging device for magnetic coupling is arranged in different polarity directions, the effect of magnetic force on the magnetic field generated by the transmission coil can be reduced, and therefore, stability and efficiency of wireless charging can be improved.

According to still another embodiment of the present invention, as a circuit unit for supplying power transferred to the transmission coil is embedded in the power terminal of the wireless charging device, the coupling unit and the circuit unit may be separated from the terminal accessory, and therefore, malfunction of wireless charging or the portable terminal occurred by heat generation or the like of the circuit unit can be prevented, and the main body of the wireless charging device can be miniaturized.

BEST MODE FOR CARRYING OUT THE INVENTION

Hereafter, embodiments of a wireless charging system for a portable terminal according to the present invention will be described with reference to the accompanying drawings.

Figure 1:
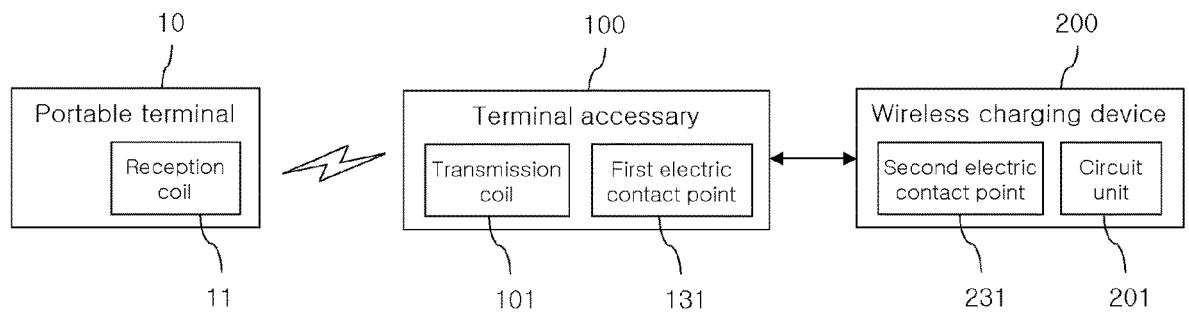
FIG. 1 is a block diagram showing the overall configuration of a wireless charging system according to an embodiment of the present invention.

FIG. 1 is a block diagram showing the overall configuration of a wireless charging system according to an embodiment of the present invention, and the wireless charging system may be configured to include a portable terminal 10, a terminal accessary 100, and a wireless charging device 200.

Referring to FIG. 1, the portable terminal 10 is a portable electronic device such as a smartphone, a PDA, a tablet PC or the like, and may be a device capable of wireless charging.

For example, the portable terminal 10 is embedded with a reception coil for wireless charge of magnetic induction method, and as induction current is generated in the reception coil by a magnetic field generated by the transmission coil, a battery embedded in the portable terminal 10 can be charged.

The terminal accessary 100 is a structure of a form that is fixed or attached to the portable terminal 10, and may be various structures such as a smart ring, a cellular phone case, a bracket, a clamp and the like.

For example, the terminal accessary 100 may be a smart ring attached on the rear surface of the portable terminal 10 and provided with a ring that is rotatable with a user's finger inserted therein and allows the portable terminal 10 to be mounted on a bottom surface.

According to an embodiment of the present invention, the terminal accessary 100 is embedded with a transmission coil 101 for generating a magnetic field for wireless charge of magnetic induction method.

Owing to the magnetic field generated by the transmission coil 101 embedded in the terminal accessary 100, electromagnetic induction occurs in the reception coil 11 embedded in the portable terminal 10 and generates induced current, and accordingly, the battery (not shown) of the portable terminal 10 may be charged wirelessly.

Meanwhile, the wireless charging device 200 is configured to be separate from the terminal accessary 100 and has a structure that can be combined with the terminal accessary 100 as needed (e.g., during the wireless charging).

The wireless charging device 200 may be embedded with a circuit unit 201 for supplying AC power to the transmission coil 101 of the terminal accessary 100.

In addition, as shown in FIG. 1, the terminal accessary 100 and the wireless charging device 200 may be provided with a first electric contact point 131 and a second electric contact point 231, respectively.

When the terminal accessary 100 and the wireless charging device 200 are combined, the first and second electric contact points 131 and 231 are contacted and electrically connected to each other, and accordingly, AC power may be supplied from the circuit unit 201 of the wireless charging device 200 to the transmission coil 101 of the terminal accessary 100.

The wireless charging system according to an embodiment of the present invention may be configured as a combination of the terminal accessary 100 and the wireless charging device 200 as described above, and may be provided as one wireless charging package.

According to an embodiment of the present invention as described above, as the transmission coil 101 is embedded in the accessory 100 fixed on the rear surface of the portable terminal 10 and power is supplied to the transmission coil 101 through the electric contact points 131 and 231 when the terminal accessary 100 is combined with the wireless charging device 200, the portable terminal 10 is wirelessly charged using the magnetic field generated by the transmission coil 101 of the terminal accessary 100, and thus wireless charging can be effectively performed even when an accessory such as a smart ring, a case or the like is mounted on the portable terminal 10.

According to another embodiment of the present invention, the terminal accessary 100 and the wireless charging device 200 are combined with each other using magnetic force, and accordingly, it is easy to combine the terminal accessary 100 and the wireless charging device 200, and the contact state of the first and second electric contact points 131 and 231 respectively provided in the terminal accessary 100 and the wireless charging device 200 may be stably maintained without being separated by external impact or the like.

Figure 2:
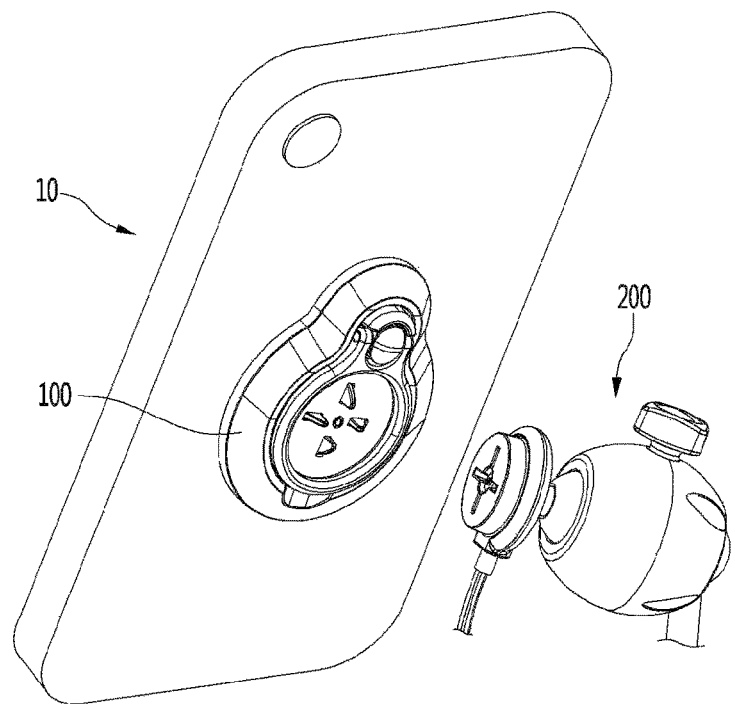
FIG. 2 is a perspective view showing the configuration of a wireless charging system according to an embodiment of the present invention.

FIG. 2 is a perspective view showing the configuration of a wireless charging system according to an embodiment of the present invention, and among the configuration of the system shown in FIG. 2, the configuration the same as those described with reference to FIG. 1 will be omitted below.

Referring to FIG. 2, a smart ring-type terminal accessary 100 provided with a ring is attached and fixed on the rear surface of the portable terminal 10, and a transmission coil 101 for generating a magnetic field is embedded in the terminal accessary 100 for wireless charge of magnetic induction method.

Meanwhile, the wireless charging device 200 has a structure on one side for being combined with the terminal accessary 100 using magnetic force, and has a structure on the other side for fixing the wireless charging device 200 to various structures such as an air blower, a flat surface, a curved surface and the like of a vehicle, and may include a power supply unit (not shown) for receiving power from the outside.

According to an embodiment of the present invention, as the terminal accessory 100 and the wireless charging device 200 are provided with a first electric contact point 131 and a second electric contact point 231, respectively, when the terminal accessory 100 and the wireless charging device 200 are combined using magnetic force, the first and second electric contact points 131 and 231 contact each other, and power may be supplied from the wireless charging device 200 to the transmission coil 101 embedded in the terminal accessory 100 through the first and second electric contact points 131 and 231 electrically connected by contact.

Meanwhile, to combine the terminal accessory 100 and the wireless charging device 200 using magnetic force, a metal member may be provided in the terminal accessory 100, and a magnetic material (e.g., a permanent magnet) may be provided in the wireless charging device 200.

According to an embodiment of the present invention, a plurality of magnets is provided in the wireless charging device 200, and two or more magnets among the plurality of magnets provided in the wireless charging device 200 may be arranged in different polarity directions.

As described above, as a plurality of magnets embedded in the wireless charging device 200 for magnetic coupling is arranged in different polarity directions, the effect of magnetic force on the magnetic field generated by the transmission coil 101 provided in the terminal accessory 100 may be reduced, and therefore, stability and efficiency of wireless charging can be improved.

Embodiments of the configuration and operation of the terminal accessory 100 and the wireless charging device 200 will be described in more detail with reference to FIGS. 3 to 7.

Figure 3:
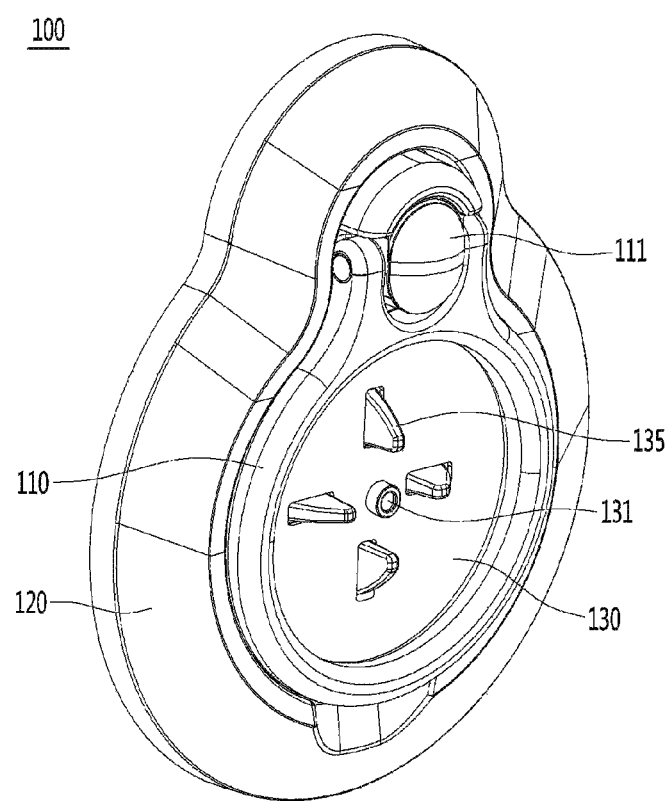
FIGS. 3 and 4 are perspective views showing the configuration of a terminal accessary according to an embodiment of the present invention.

FIG. 3 is a perspective view showing the configuration of a terminal accessory according to an embodiment of the present invention.

Referring to FIG. 3, the terminal accessory 100 may include a ring 110 through which a user's finger is inserted, and a housing 120 one side of which is attached on the rear surface of the portable terminal 10 and having a transmission coil 101 arranged inside thereof.

Meanwhile, the ring 110 may be rotatably connected to the housing 120 using a connection member 111, and a first attachment unit 130 provided with a metal at least in a portion for magnetic coupling with the wireless charging device 200 may be formed on the other side of the housing 120.

For example, the ring 110 has a shape similar to a ring to allow a user to insert a finger, and rotates as much as a predetermined angle using a hinge structure of the connection member 111 to be folded or unfolded in the direction to the rear surface of the portable terminal 10.

In addition, the first attachment unit 130 is configured of a metal plate made of a metal such as iron (Fe) or the like to be attached to the magnet provided in the wireless charging device 200, and the first electric contact point 131 may be formed at the center portion of the first attachment unit 130.

Accordingly, when the wireless charging device 200 is attached to the first attachment unit 130 by magnetic force, the first electric contact point 131 at the center portion is electrically connected to the second electric contact point 231 of the wireless charging device 200, and power may be supplied to the transmission coil 101.

Figure 4:
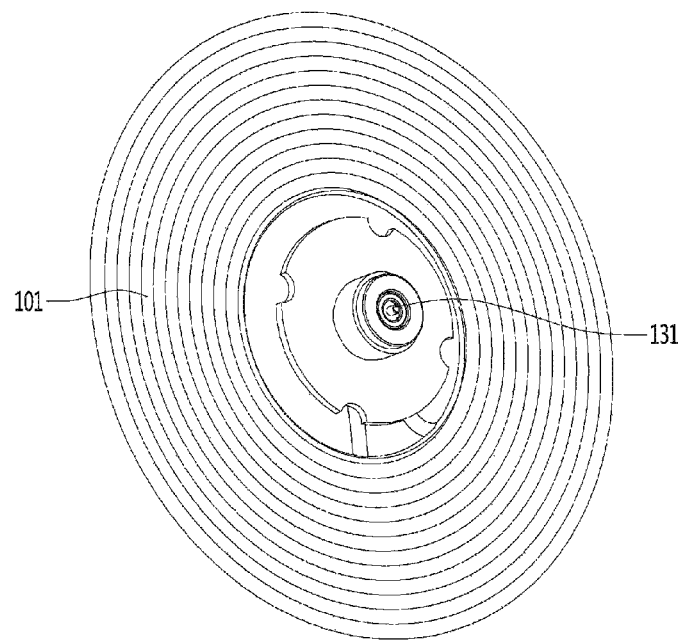

The transmission coil 101 is in the shape as shown in FIG. 4, and may be electrically connected to the first electric contact point 131 and arranged inside the housing 120 of the terminal accessory 100.

Here, the housing 120 is made of synthetic resin such as plastic or the like, and attached and fixed on the rear surface of the portable terminal 10 using an adhesive member such as a double-sided tape, and may be configured of a front housing rotatable by a user and a rear housing attached on the rear surface of the portable terminal 10.

In this case, a rotating member rotating together with the front housing and at least one plate for supporting the rotating member may be provided inside the housing 120 of the terminal accessory 100.

Meanwhile, a plurality of protrusions 135 may be formed around the first electric contact point 131 of the first attachment unit 130 to facilitate coupling with the wireless charging device 200.

For example, four protrusions 135 are radially arranged on the first attachment unit 130 of the terminal accessory 100, and the protrusions 135 may be formed to have a slope decreasing the height from the center toward the outer regions.

When the terminal accessory 100 and the wireless charging device 200 are attached by magnetic force, the positions of the first electric contact point 131 and the second electric contact point 231 of the wireless charging device 200 are naturally and exactly matched and aligned as the protrusions 135 formed on the first attachment unit 130 are inserted into the holes (not shown) formed in the wireless charging device 200, and random rotation or movement after coupling can be prevented.

Accordingly, while the terminal accessory 100 and the wireless charging device 200 are combined and wireless charging is performed, a case of not performing wireless charging as the first electric contact point 131 and the second electric contact point 231 are out of position or reducing charging speed as the wireless charging efficiency is lowered can be prevented.

Figure 5:
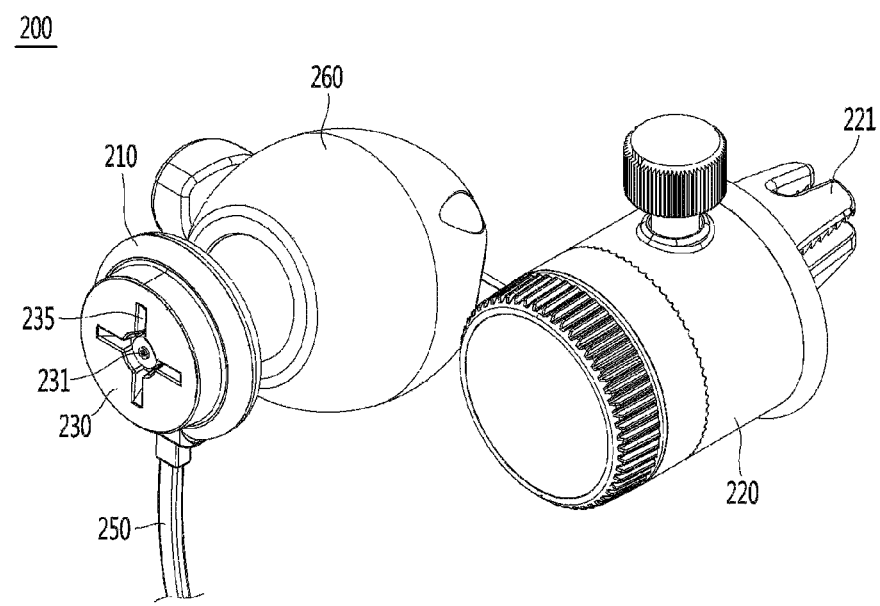
FIGS. 5 and 6 are perspective views showing the configuration of a wireless charging device according to an embodiment of the present invention.

FIG. 5 is a perspective view showing the configuration of a wireless charging device according to an embodiment of the present invention, and the wireless charging device 200 may be configured to include a coupling unit 210, a fixing unit 220, a cable 250 and a connection unit 260.

Referring to FIG. 5, the coupling unit 210 is a unit combined with the terminal accessory 100 by magnetic force, and may include a second attachment unit 230 having a second electric contact point 231 formed at the center portion, and a plurality of grooves 235 formed around the second electric contact point 231 to facilitate coupling with the terminal accessory 100.

As described above, as the plurality of grooves 235 formed around the second electric contact point 231 is configured to insert the plurality of protrusions 135 formed on the first attachment unit 130 of the terminal accessory 100 when the wireless charging device 200 is combined with the terminal accessory 100, the terminal accessory 100 and the wireless charging device 200 may be stably combined by magnetic force.

The cable 250 is electrically connected to the second electric contact point 231 as one end of which is connected to the coupling unit 210, and the other end may be connected to an external power source which supplies power to be transferred to the transmission coil 101 of the terminal accessory 100.

Meanwhile, a magnet for magnetic coupling with the terminal accessory 100 may be embedded in the coupling unit 210 of the wireless charging device 200, and the magnet embedded in the coupling unit 210 may be a permanent magnet made of neodymium (NdFeB), samarium cobalt (SmCo), ferrite, or the like.

According to an embodiment of the present invention, a plurality of magnets is provided inside the coupling unit 210, and the plurality of embedded magnets may be arranged so that two adjacent magnets may have different polarities.

For example, four magnets are arranged inside the coupling unit 230, and two magnets adjacent to each other among the four magnets may be arranged to have different polarities (N pole-S pole) toward the attachment direction, and two magnets spaced apart from each other among the four magnets may be arranged to have the same polarity (N pole-N pole, and S pole-S pole) toward the attachment direction.

Figure 6:
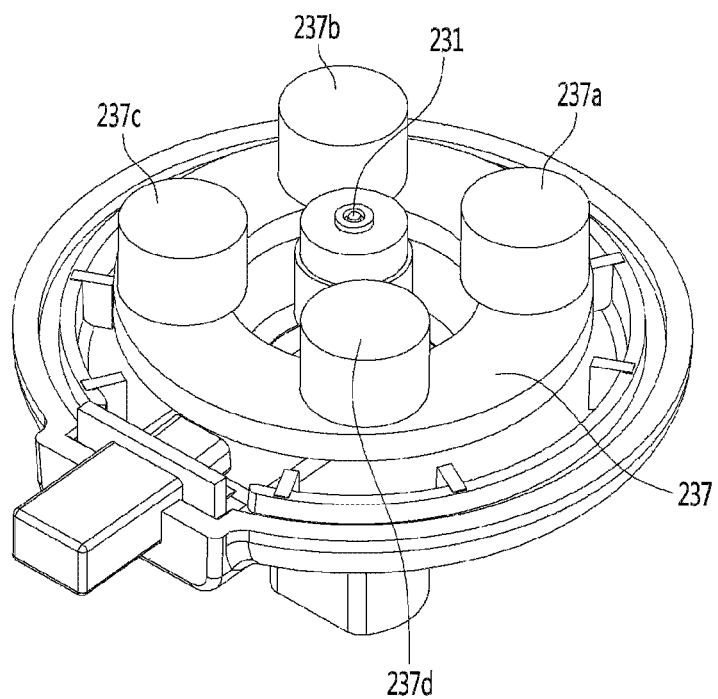

Referring to the internal structure of the coupling unit 210 shown in FIG. 6, as the second electric contact point 231 is formed at the center portion and a base unit 237 is formed around the second electric contact point 231, four magnets may be arranged on the base unit 237.

For example, four magnet housings 237a, 237b, 237c, and 237d are formed on the base unit 237, and one magnet may be placed and fixed inside each of the magnet housings 237a, 237b, 237c, and 237d.

Figure 7:
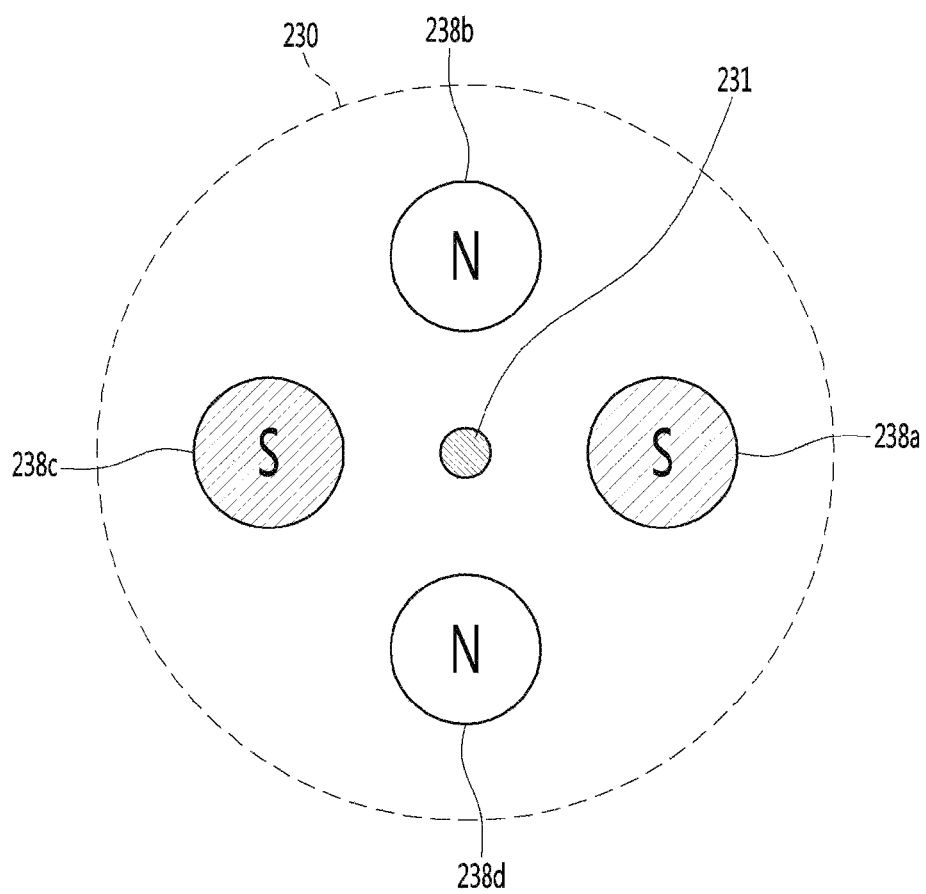
FIG. 7 is a view illustrating an embodiment of arranging a plurality of magnets embedded in a wireless charging device.

Describing an embodiment of the polarity directions of the four magnets with reference to FIG. 7, two magnets 238a-238d, 238a-238b, 238b-238c, and 238c-238d adjacent to each other around the second electric contact point 231 among the four magnets 238a, 238b, 238c, and 238d may be arranged to have different polarities toward the second attachment unit 230.

In addition, two magnets 238a-238c and 238b-238d facing each other with interposition of the second electric contact point 231 among the four magnets 238a, 238b, 238c, 238d may be arranged to have the same polarity toward the second attachment unit 230.

As described above, as the plurality of magnets embedded in the wireless charging device 200 is arranged to allow adjacent magnets to have different polarity directions, strength of magnetic force in an area adjacent to the coupling unit 210 of the wireless charging device 200 is increased, and accordingly, the terminal accessory 100 and the wireless charging device 200 may be stably combined using magnets of a small size.

In addition, according to arrangement of the polarity directions as described above, as it is induced to generate a magnetic field by the magnets 238a, 238b, 238c, and 238d in a direction parallel to the second attachment unit 230, rather than a direction perpendicular to the second attachment unit 230, the effect of the magnetic field of the magnets embedded in the wireless charging device 200 on the terminal accessory 100 or the portable terminal 10 may be reduced, and accordingly, the phenomenon of affecting the magnetic field generated from the transmission coil 101 or affecting operation of the portable terminal 10 by the magnetic field of the magnets embedded in the wireless charging device 200 can be improved.

Meanwhile, the fixing unit 220 may have a structure for fixing the wireless charging device 200 to a vent hole of a vehicle, and for this purpose, the fixing unit 220 may include a fixing clip 221 configuring of a pair of coupling pins that can be insertion-coupled to the wings of the vent hole of the vehicle.

The inserted state may be firmly fixed as the fixing clip 221 is elastically deformed and press-fitted into the vent hole of the vehicle.

Although an embodiment of the present invention has been described above for example, in which the fixing unit 220 is provided with the fixing clip 221 that can be elastically deformed, the present invention is not limited thereto, and various shapes capable of being inserted and press-fitted in a vent hole of a vehicle by elastic deformation may be employed.

Meanwhile, the coupling unit 210 and the fixing unit 220 of the wireless charging device 200 are connected by the connection unit 260, and the connection unit 260 may be configured to be capable of adjusting an angle by rotation.

For example, the coupling unit 210 and the fixing unit 220 of the wireless charging device 200 are connected through the connection unit 260 of a ball joint structure to allow the coupling unit 210 to rotate with respect to the fixing unit 220.

The ball joint structure of the connection unit 260 is manufactured by inserting two balls into an empty ball housing of a spherical shape and connecting the balls, and since the ball joint structure may freely rotate 360 degrees, up, down, front, back, left and right angles of the portable terminal 10 may be easily adjusted.

In this case, each of the coupling unit 210 and the fixing unit 220 of the wireless charging device 200 may have a ball for being connected to the ball joint structure.

The ball of the coupling unit 210 and the ball of the fixing unit 220 are respectively inserted in an empty ball housing of a spherical shape and may rotate with respect to the ball housing, and accordingly, the coupling unit 210 may freely rotate 360 degrees with respect to the fixing unit 220.

The empty ball housing of a spherical shape is configured of two bodies to be fixed using bolts and nuts after inserting the two balls, and the ball housing may further include a ball fixing means (not shown) for fixing a rotated state of the two balls.

The ball fixing means is a member moving up and down, which is arranged between the two balls and has inclined surfaces on both sides, and may fix a rotated state of the two balls in a way that the inclined surfaces on both sides are tightly attached to the two balls.

Although an embodiment of the present invention has been described above for example, in which the wireless charging device 200 is fixed to a vent hole of a vehicle, the present invention is not limited thereto, and the wireless charging device 200 may have a structure that can be fixed in a variety of environments, such as a flat surface or a curved surface at home or in an office space, in addition to the vent hole of a vehicle.

Figure 8:
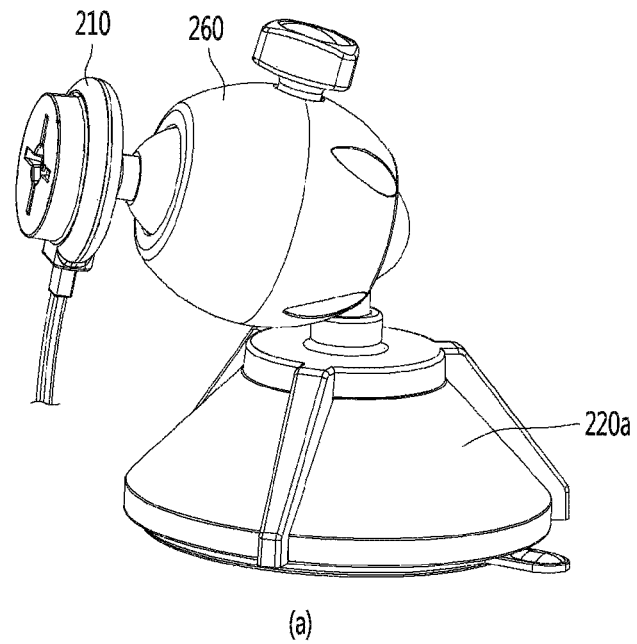
FIGS. 8 and 9 are perspective views showing the configuration of a wireless charging device according to another embodiment of the present invention.
Figure 8:
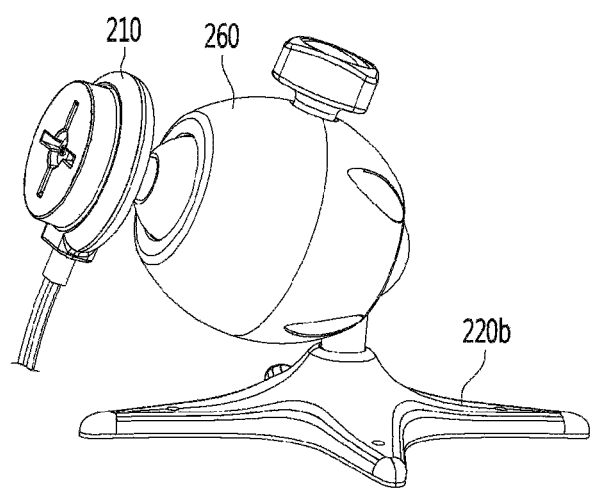

Referring to FIG. 8(a), as the fixing unit 220 of the wireless charging device 200 has a structure that can be fixed on a flat surface using an adsorption method, the wireless charging device 200 may be fixed on a desk in an office space.

In addition, referring to FIG. 8(b), as the fixing unit 220 of the wireless charging device 200 includes a plurality of grippers made of a flexible material, the wireless charging device 200 may be fixed on various floor surfaces at home.

Figure 9:
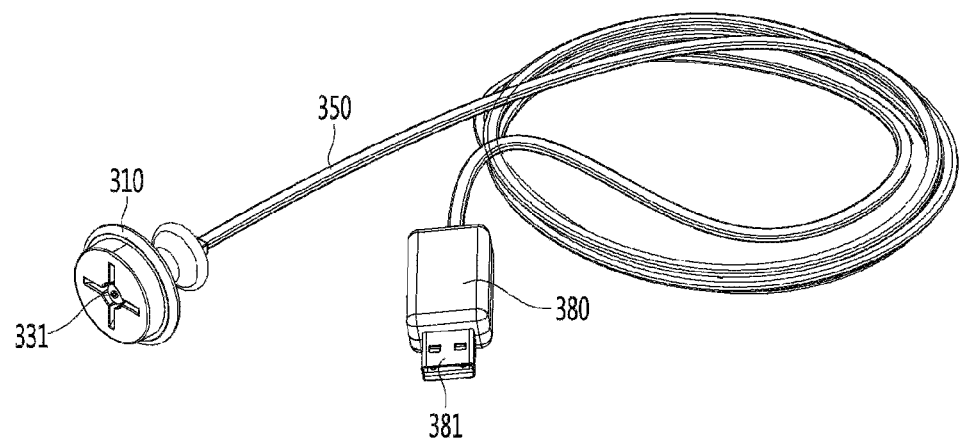

FIG. 9 is a view showing the configuration of a wireless charging device according to another embodiment of the present invention, and the wireless charging device shown in the figure is a wireless charging device of a structure that can be used in the form of a cable without being fixed at a specific location.

Referring to FIG. 9, the coupling unit 310 of the wireless charging device may have a configuration the same as that of the coupling unit 210 of the wireless charging device 200 described with reference to FIGS. 1 to 8, such as a second electric contact point 331 formed and magnets embedded therein.

One end of the cable 350 is connected to the coupling unit 310 and then electrically connected to the second electric contact point 331, and the other end may be connected to a power terminal.

For example, the power terminal may be a USB terminal 380 provided with a USB jack 381 as shown in FIG. 9, and the cable 350 may connect the coupling unit 310 and the USB terminal 380.

Meanwhile, according to still another embodiment of the present invention, a circuit unit (not shown) for supplying AC power transferred to the transmission coil 101 of the terminal accessory 100 may be embedded in the USB terminal 380.

The circuit unit embedded in the USB terminal 380 may include a power supply unit for being supplied with DC power from the outside, a conversion unit for converting the supplied power to AC power, and the like.

For example, the power supply unit is for being supplied with DC power from the outside, and may include a step-down transformer for lowering supply voltage to a desired level, and a rectifying circuit for converting AC voltage into a DC signal.

In addition, the power supply unit may be provided with a power terminal connected to a cable of a separate charger and supplied with power from the outside.

The conversion unit may include an oscillator for converting DC voltage inputted from the power supply unit into high frequency AC power, and supplying the AC power to the transmission coil.

As described above, as the circuit unit for supplying power transferred to the transmission coil 101 of the terminal accessory 100 is embedded in the power terminal of the wireless charging device, the coupling unit 310 and the circuit unit coupled to the terminal accessory 100 by magnetic force may be separated, and therefore, malfunction of wireless charging or the portable terminal 10 occurred by heat generation or the like of the circuit unit can be prevented, and the size of the coupling unit 310 corresponding to the main body of the wireless charging device may be reduced.

Meanwhile, embedding the circuit unit in the terminal of the cable 350 as described above is also applicable to the wireless charging device 200 as described with reference to FIGS. 2 to 8, and in this case, the coupling unit 210 and the cable 250 may have a configuration the same as that of the wireless charging device shown in FIG. 9 except the connection direction between the two.

Hereinafter, a wireless charging system according to still another embodiment of the present invention will be described with reference to FIGS. 10 to 12.

Among the configuration and operation of the wireless charging system according to still another embodiment of the present invention described below, the configuration and operation the same as those described with reference to FIGS. 1 to 9 will be omitted.

Figure 10:
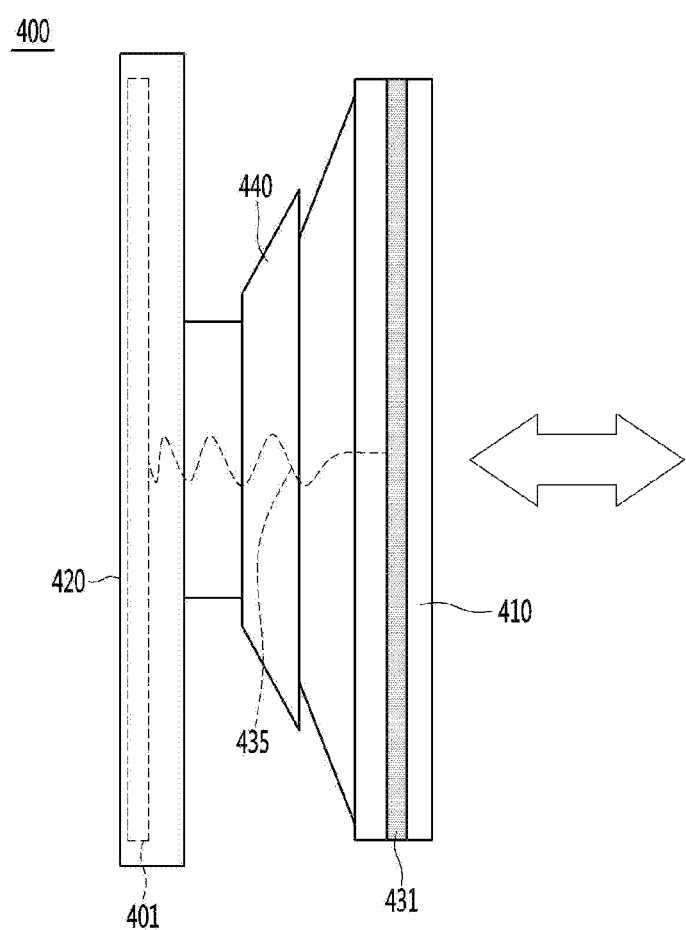
FIG. 10 is a view showing the configuration of a terminal accessary according to still another embodiment of the present invention.

FIG. 10 is a view showing the configuration of a terminal accessary according to still another embodiment of the present invention, which is an embodiment implementing a terminal accessary 400 including an elastic material to be expanded or contracted.

Referring to FIG. 10, the terminal accessory 400 may be configured to include a gripping unit 410, a connection unit 440, and an attachment unit 420.

The attachment unit 420 is adhered and fixed on the rear surface of the portable terminal 10 to allow the terminal accessory 400 to be surface-attached on the rear surface of the portable terminal 10, and a transmission coil 401 may be embedded in the attachment unit 420 as described with reference to FIGS. 1 to 9.

Meanwhile, the gripping unit 410 is intended to allow a user to grip the terminal accessory 400 and the portable terminal 10 to which the terminal accessory 400 is attached, or to mount the terminal accessory 400 and the portable terminal 10 on a flat surface such as a table or the like, and it may be a configuration detachably coupled to a wireless charging device 500, in addition to the gripping or mounting function described above.

Here, the gripping unit 410 may be formed with a first electric contact point 431 contacting a second electric contact point 531 formed in the wireless charging device 500.

The connection unit 440 connects the attachment unit 420 and the gripping unit 410, and may include an elastic material to be expanded or contracted.

For example, the connection unit 440 generally has a shape similar to a cone, and may be configured of a plurality of elastic members made of an elastic material.

Each of the elastic members has a different size or shape, and as a user grabs the gripping unit 410 and applies a force, any one of the elastic members may be combined with or separated from another one, and the connection unit 440 may be contracted or expanded overall.

That is, when a user grabs and pulls the gripping unit 410 of the terminal accessory 400 in a direction opposite to the rear surface of the portable terminal 10, the connection unit 440 is expanded as the elastic members constituting the connection unit 440 are separated from each other, and the user may stably grab the portable terminal 10 by inserting a finger in the expanded connection unit 440 or may wind and store the earphone string around the expanded connection unit 440.

On the other hand, when the user grabs and pushes the gripping unit 410 of the terminal accessory 400 toward the rear surface of the portable terminal 10, the connection unit 440 is contracted as the elastic members constituting the connection unit 440 are combined with each other.

Describing the configuration of the transmission coil 401 and the first electric contact point 431 provided in the terminal accessory 400 in more detail, the transmission coil 401 is embedded in the attachment unit 420 of the terminal accessory 400, and the first electric contact point 431 configured of positive and negative electric contact points may be formed in the shape of a circular ring having a predetermined width to surround the outer circumferential surface of the gripping unit 410.

The first electric contact point 431 formed in the gripping unit 410 and the transmission coil 401 embedded in the attachment unit 420 may be connected to each other using a connection wire 435 passing through the interior of the connection unit 440.

Figure 11:
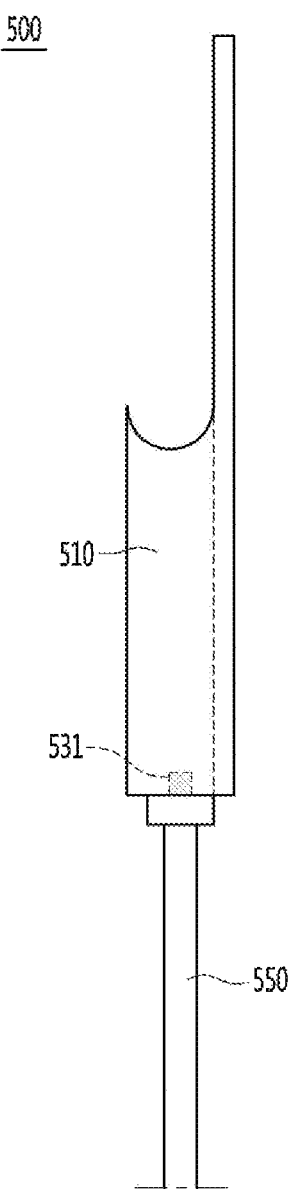
FIG. 11 is a view showing the configuration of a wireless charging device according to still another embodiment of the present invention.
Figure 12:
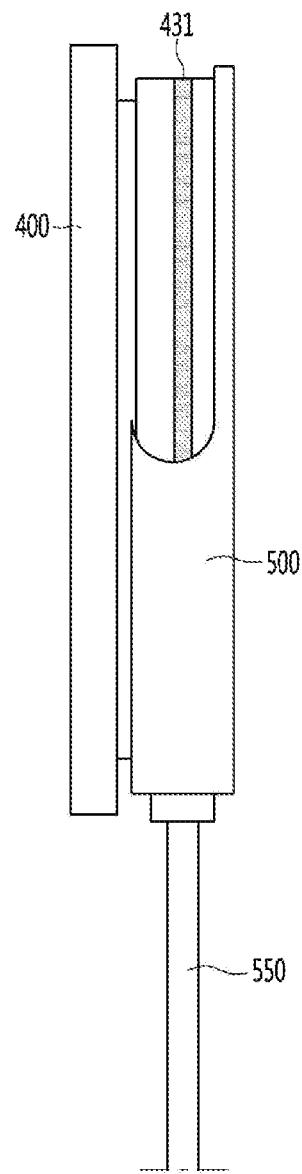
FIG. 12 is a view showing a state of combining a terminal accessary with a wireless charging device according to still another embodiment of the present invention.

Referring to FIG. 11, the wireless charging device 500 is detachably combined with the terminal accessory 400, and when the wireless charging device 500 is combined with the terminal accessory 400, it may perform a function of supplying AC power to the transmission coil 401 embedded in the attachment unit 420 of the terminal accessory 400.

Referring to FIG. 11, the wireless charging device 500 may include a coupling unit 510 and a cable 550.

The coupling unit 510 is a configuration for allowing the gripping unit 410 of the terminal accessory 400 to be inserted and coupled, and the coupling unit 510 may be provided with the second electric contact point 531 for being in contact with the first electric contact point 431 of the gripping unit 410 of the terminal accessory 400.

A resting groove into which the gripping unit 410 of the terminal accessory 400 is inserted is formed in the coupling unit 510, and the resting groove for the gripping unit 410 may have a 'U' shape seeing from the front side to allow a lower portion of the circular-shape gripping part 410 to be inserted therein.

Here, the second electric contact point 531 for being in contact with the first electric contact point 431 of the terminal accessory 400 may be formed at a lower end inside the resting groove of the gripping unit 410.

Meanwhile, the cable 550 provided in the wireless charging device 500 may be connected to the coupling unit 510 and electrically connected to the second electric contact point 531 provided in the coupling unit 510.

The configuration of the cable 550 may be the same as those of the cables 250 and 350 as described with reference to FIGS. 2 to 9, and one end of the cable 550 may be connected to the power terminal 380 having a circuit unit embedded therein.

In addition, a hook unit (not shown) for fixing the upper portion of the gripping unit 410 of the terminal accessory 400 may be further provided in the coupling unit 510 of the wireless charging device 500.

As described above, as the first electric contact point 431 is formed to surround the outer circumferential surface of the gripping unit 410 of the terminal accessory 400, and the second electric contact point 531 is formed at a corresponding position of the lower end of the coupling unit 510 of the wireless charging device 500, in which the lower portion of the gripping unit 410 of the terminal accessory 400 is inserted and fixed, the first and second electric contact points 431 and 531 are naturally aligned and contact each other although the angle or position of the gripping unit 410 of the terminal accessory 400 inserted into the coupling unit 510 of the wireless charging device 500 is slightly changed, and wireless charging efficiency may be improved by preventing power loss according to a contact failure.

Referring to FIG. 10, as the gripping unit 410 of the terminal accessory 400 attached on the rear surface of the portable terminal 10 is inserted into and fixed inside the coupling unit 510 of the wireless charging device 500, the terminal accessory 400 and the wireless charging device 500 may be easily combined.

Here, although it is preferable that the connection unit 440 of the terminal accessory 400 is in a contracted state when the terminal accessory 400 attached on the rear surface of the portable terminal 10 is combined with the wireless charging device 500, the present invention is not limited thereto.

When the gripping unit 410 of the terminal accessory 400 is inserted into and fixed inside the coupling unit 510 of the wireless charging device 500, the terminal accessory 400 and the wireless charging device 500 are combined, and the first electric contact point 431 formed on the outer circumferential surface of the gripping unit 410 of the terminal accessory 400 may be automatically aligned to the position of the second electric contact point 531 formed at the lower center portion of the coupling unit 510 of the wireless charging device 500 to contact each other.

Accordingly, the AC power output from the wireless charging device 500 may be applied to the second electric contact point 531 through the cable 550, and the AC power may be supplied to the transmission coil 401 through the first electric contact point 431 of the terminal accessory 400 that is in contact with the second electric contact point 531.

As the transmission coil 401 supplied with AC power as described above generates a magnetic field, induction current is generated from the reception coil 11 provided in the portable terminal 10 in a magnetic induction method, and the battery is charged.

Optimal embodiments of present invention have been described in the drawings and specification. Here, although the specific terms are used only for the purpose of describing the present invention, and are not used to limit the meaning or the scope of the present invention described in the claims. Therefore, those skilled in the art may understand that various modifications and other equivalent embodiments can be made therefrom. Therefore, the true technical scope of the present invention should be defined by the technical spirit of the appended claims.

The invention claimed is:

1. A wireless charging system for a portable terminal, the system comprising:
   a terminal accessory fixed on a rear surface of the portable terminal and embedded with a transmission coil for generating a magnetic field for wireless charge of magnetic induction method; and
   a wireless charging device that can be combined with the terminal accessory using magnetic force,
   wherein the terminal accessory and the wireless charging device are provided with a first electric contact point and a second electric contact point, respectively, and when the terminal accessory and the wireless charging device are combined, the first and second electric contact points contact each other, and power is supplied from the wireless charging device to the transmission coil embedded in the terminal accessory, and the wireless charging device is provided with two or more magnets arranged in different polarity directions,
   wherein the wireless charging device comprises:
   a coupling unit combined with the terminal accessory by magnetic force; and
   a cable one end of which is connected to the coupling unit and electrically connected to the second electric contact point, and
   wherein the coupling unit includes a second attachment unit having the second electric contact point formed at a center portion and a plurality of grooves formed around the second electric contact point to facilitate coupling with the terminal accessory.

2. The system according to claim 1, wherein the terminal accessory comprises:
   a ring through which a user's finger is inserted;
   a housing one side of which is attached on the rear surface of the portable terminal and having a transmission coil arranged therein; and
   a connection member for connecting the ring to the housing to be rotatable,
   wherein on an other side of the housing, a first attachment unit provided with a metal is formed at least in a portion for magnetic coupling with the wireless charging device.

3. The system according to claim 2, wherein the first electric contact point is formed at a center portion of the first attachment unit, and when the wireless charging device is attached to the first attachment unit by magnetic force, the first electric contact point is electrically connected to the second electric contact point of the wireless charging device, and power is supplied to the transmission coil.

4. The system according to claim 2, wherein a plurality of protrusions for facilitating coupling with the wireless charging device is formed around the first electric contact point of the first attachment unit.

5. The system according to claim 1, wherein four magnets are arranged around the second electric contact point inside the coupling unit, and
wherein two magnets adjacent to each other around the second electric contact point among the four magnets have different polarities toward the second attachment unit, and two magnets facing each other with interposition of the second electric contact point among the four magnets have a same polarity toward the second attachment unit.

6. The system according to claim 1, wherein the wireless charging device further comprises:
a fixing unit for fixing the wireless charging device to any one of an air blower, a flat surface, and a curved surface of a vehicle; and
a connection unit for connecting the fixing unit and the coupling unit using a ball joint structure.

7. The system according to claim 1, further comprising a power terminal connected to an other end of the cable and embedded with a circuit unit for supplying AC power transferred to the transmission coil of the terminal accessory,
wherein the circuit unit comprises:
a power supply unit for being supplied with DC power from outside; and
a conversion unit for converting the supplied power into AC power.

8. A wireless charging device for a portable terminal, which is combined with a terminal accessory embedded with a transmission coil to charge the portable terminal, the wireless charging device comprising:
a coupling unit combined with the terminal accessory using magnetic force, and provided with a second electric contact point for being in contact with a first electric contact point formed in the terminal accessory; and
a cable one end of which is connected to the coupling unit and electrically connected to the second electric contact point,
wherein when the terminal accessory and the wireless charging device are combined, power supplied through the cable is transferred to the transmission coil of the terminal accessory as the first and second electric contact points contact each other, and two or more magnets arranged in different polarity directions are embedded in the coupling unit,
wherein the coupling unit includes a second attachment unit attached to a first attachment unit provided in the terminal accessory by magnetic force, and
wherein the second attachment unit includes the second electric contact point formed at a center portion, and a plurality of grooves formed around the second electric contact point to facilitate coupling with the terminal accessory.

9. The device according to claim 8, wherein four magnets are arranged around the second electric contact point inside the coupling unit, and
wherein two magnets adjacent to each other around the second electric contact point among the four magnets have different polarities toward the second attachment unit, and two magnets facing each other with interposition of the second electric contact point among the four magnets have a same polarity toward the second attachment unit.

10. The device according to claim 8, wherein the wireless charging device further comprises:
a fixing unit for fixing the wireless charging device to any one of an air blower, a flat surface, and a curved surface of a vehicle; and
a connection unit for connecting the fixing unit and the coupling unit using a ball joint structure.

11. The device according to claim 8, further comprising a power terminal connected to an other end of the cable and embedded with a circuit unit for supplying AC power transferred to the transmission coil of the terminal accessory,
wherein the circuit unit comprises:
a power supply unit for being supplied with DC power from outside; and
a conversion unit for converting the supplied power into AC power.

* * * * *